United States Patent
Jeon et al.

(10) Patent No.: US 10,581,277 B2
(45) Date of Patent: Mar. 3, 2020

(54) APPARATUS FOR REDUCING ELECTROMAGNETIC WAVE IN WIRELESS POWER TRANSMITTER USING REDUCING COIL

(71) Applicant: Electronics and Telecommunications Research Institute, Daejeon (KR)

(72) Inventors: Sang Bong Jeon, Daejeon (KR); Jung Ick Moon, Daejeon (KR); Sang-Won Kim, Daejeon (KR); Seong-Min Kim, Daejeon (KR); In Kui Cho, Daejeon (KR); Jong Hwa Kwon, Daejeon (KR); Byung Chan Kim, Daejeon (KR); Hyung Do Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 355 days.

(21) Appl. No.: 15/428,283

(22) Filed: Feb. 9, 2017

(65) Prior Publication Data

US 2018/0152049 A1 May 31, 2018

(30) Foreign Application Priority Data

Nov. 28, 2016 (KR) .................. 10-2016-0159206

(51) Int. Cl.
*H02J 50/12* (2016.01)
*H02J 7/02* (2016.01)
*H02J 50/90* (2016.01)

(52) U.S. Cl.
CPC .............. *H02J 50/12* (2016.02); *H02J 7/025* (2013.01); *H02J 50/90* (2016.02)

(58) Field of Classification Search
CPC .................................. H02J 50/00; H02J 7/00
USPC ........................................................ 307/104
See application file for complete search history.

(56) References Cited

U.S. PATENT DOCUMENTS

| | | | | |
|---|---|---|---|---|
| 2011/0254376 | A1* | 10/2011 | Sasaki ................... | B60L 5/005 307/104 |
| 2017/0141615 | A1* | 5/2017 | Moon ..................... | H02J 50/12 |

FOREIGN PATENT DOCUMENTS

| | | |
|---|---|---|
| JP | 2015-15852 | 1/2015 |
| KR | 10-1045585 | 6/2011 |
| KR | 10-1231853 | 2/2013 |
| KR | 10-2015-0074801 | 7/2015 |
| KR | 10-2017-0009683 | 1/2017 |

* cited by examiner

*Primary Examiner* — Rexford N Barnie
*Assistant Examiner* — Joseph N Inge
(74) *Attorney, Agent, or Firm* — Kile Park Reed & Houtteman PLLC

(57) ABSTRACT

Provided is an apparatus for reducing an electromagnetic wave in a wireless power transmitter using a reducing coil, the apparatus that may cancel external emission of a magnetic field formed at a transmission coil using the reducing coil based on induced electromotive force.

9 Claims, 12 Drawing Sheets

APPARATUS FOR REDUCING ELECTROMAGNETIC WAVE IN WIRELESS POWER TRANSMITTER USING REDUCING COIL

CROSS-REFERENCE TO RELATED APPLICATION(S)

This application claims the priority benefit of Korean Patent Application No. 10-2016-0159206 filed on Nov. 28, 2016, in the Korean Intellectual Property Office, the disclosure of which is incorporated herein by reference for all purposes.

BACKGROUND

1. Field

One or more example embodiments relate to an apparatus for reducing an electromagnetic wave in a wireless power transmitter using a reducing coil, and more particularly, to an electromagnetic wave reducing apparatus that reduces external emission of an unnecessary harmonic, rather than a transmission frequency to transmit wireless power.

2. Description of Related Art

Wireless power transmission technology is applied to an electronic device such as a smart phone to enable wireless power supply to an electronic device beyond the limit of an existing charging scheme that supplies power using wire. Recently, for wireless power supply, the wireless power transmission technology has been applied to various electronic devices, and transmission power that may be wirelessly transmitted is increasing from several watts (W) to several kilowatts (kW).

However, as energy is transmitted wirelessly, electromagnetic wave emission into a space increases, which causes growing concerns about electromagnetic wave interference to other devices. In particular, a wireless power transmitter generates a square wave of a low frequency band in a transmission circuit and transmits the square wave to a transmission coil. The transmission coil transmits energy through a free space for wireless power transmission. A reception coil receives the energy from the free space and power is supplied through a reception circuit.

Here, the square wave of the low frequency band emits an electromagnetic wave by a harmonic component as well as a basic frequency of the square wave, and the electronic wave emission of the harmonic component is considerably great at 30 megahertz (MHz) or less. As existing electromagnetic compatibility (EMC) caused by electromagnetic wave emission, conducted emission at 30 MHz or below and radiated emission at 30 MH or above cause device malfunction. However, wireless power transmission influences device malfunction and interference by radiated emission at 30 MHz or below.

Thus, there is regulation of wireless power transmitters with respect to electromagnetic wave emission. However, the regulation only sets a radiated emission strength limit from a low frequency band except a frequency for wireless power transmission, but does not include measures to reduce an electromagnetic wave.

Accordingly, measures to reduce an electromagnetic wave are needed to reduce external emission of harmonic components.

SUMMARY

An aspect provides an electromagnetic wave reducing apparatus that may reduce radiated emission of a harmonic in a low frequency band and satisfy a radiated emission strength limit in wireless power transmission.

According to an aspect, there is provided an electromagnetic wave reducing apparatus including a first reducing coil and a second reducing coil provided in a cylindrical structure at a position a predetermined distance spaced apart from one side of a transmission coil provided in a cylindrical structure for wireless power transmission, the transmission coil forming a first magnetic field and a second magnetic field by a first induced current that flows through the transmission coil in response to the wireless power transmission, a first capacitor coupled to the first reducing coil to adjust a first resonant frequency formed at the first reducing coil, and a second capacitor coupled to the second reducing coil to adjust a second resonant frequency formed at the second reducing coil. The first magnetic field may be cancelled or enhanced and emitted by the first reducing coil, and the second magnetic field may be cancelled or enhanced and emitted by the second reducing coil.

Distances from the same center of the cylindrical structures to the first reducing coil and the second reducing coil may be greater than a distance from the same center of the cylindrical structures to the transmission coil, a cross-sectional area of the cylindrical structure of the first reducing coil may be greater than a cross-sectional area of the cylindrical structure of the second reducing coil, and the first reducing coil and the second reducing coil may be disposed collinearly in a Z-axial direction.

The first resonant frequency of the first reducing coil may be adjusted by the first capacitor such that the first reducing coil resonates at a frequency lower than a harmonic of the first magnetic field emitted by the transmission coil, the second resonant frequency of the second reducing coil may be adjusted by the second capacitor such that the second reducing coil resonates at a frequency lower than a harmonic of the second magnetic field emitted by the transmission coil, and the harmonic of the second magnetic field may have a shorter variation of period than the harmonic of the first magnetic field.

The first reducing coil may form a second induced current that flows in an opposite direction to the first induced current generated at the transmission coil by the adjusted first resonant frequency, and the first magnetic field formed by the first induced current of the transmission coil may be cancelled and emitted externally under the influence of a third magnetic field formed by the second induced current of the first reducing coil.

The second reducing coil may form a third induced current that flows in an opposite direction to the first induced current generated by the transmission coil by the adjusted second resonant frequency, and the second magnetic field formed by the first induced current of the transmission coil may be cancelled and emitted externally under the influence of a fourth magnetic field formed by the third induced current of the second reducing coil.

The first resonant frequency of the first reducing coil may be adjusted by the first capacitor such that the first reducing coil resonates at a frequency higher than a harmonic of the first magnetic field emitted by the transmission coil, and the second resonant frequency of the second reducing coil may be adjusted by the second capacitor such that the second reducing coil resonates at a frequency higher than a harmonic of the second magnetic field emitted by the transmission coil.

The first reducing coil may form a second induced current that flows in the same direction as the first induced current generated at the transmission coil by the adjusted first resonant frequency, and the first magnetic field formed by the first induced current of the transmission coil may be enhanced and emitted externally under the influence of a third magnetic field formed by the second induced current of the first reducing coil.

The second reducing coil may form a third induced current that flows in the same direction as the first induced current generated by the transmission coil by the adjusted second resonant frequency, and the second magnetic field formed by the first induced current of the transmission coil may be enhanced and emitted externally under the influence of a fourth magnetic field formed by the third induced current of the second reducing coil.

According to another aspect, there is also provided an electromagnetic wave reducing apparatus including a reducing coil provided in a cylindrical structure at a position a predetermined distance spaced apart from one side of a transmission coil provided in a cylindrical structure for wireless power transmission, a first capacitor connected to an inductance of the reducing coil to adjust a first resonant frequency formed at the reducing coil, and a second capacitor connected in series to the first capacitor to adjust a second resonant frequency formed at the reducing coil. A magnetic field formed by a first induced current that flows through the transmission coil in response to the wireless power transmission may be cancelled or enhanced and emitted by the reducing coil.

The first resonant frequency of the reducing coil may be adjusted by the first capacitor such that the reducing coil resonates at a frequency lower than a first harmonic of the magnetic field formed by the first induced current, the second resonant frequency of the reducing coil may be adjusted by the second capacitor such that the reducing coil resonates at a frequency lower than a second harmonic of the magnetic field formed by the first induced current, and the second harmonic of the magnetic field may have a shorter variation of period than the first harmonic of the magnetic field.

The reducing coil may form a plurality of second induced currents that flow in an opposite direction to the first induced current generated at the transmission coil by the adjusted first resonant frequency and the adjusted second resonant frequency, and the magnetic field formed by the first induced current of the transmission coil may be cancelled and emitted externally under the influence of a second magnetic field formed by the plurality of second induced currents of the reducing coil.

The first resonant frequency of the reducing coil may be adjusted by the first capacitor such that the reducing coil resonates at a frequency higher than a first harmonic of the magnetic field formed by the first induced current, and the second resonant frequency of the reducing coil may be adjusted by the second capacitor such that the reducing coil resonates at a frequency higher than a second harmonic of the magnetic field formed by the first induced current.

The reducing coil may form a plurality of second induced currents that flow in the same direction as the first induced current generated at the transmission coil by the adjusted first resonant frequency and the adjusted second resonant frequency, and the magnetic field formed by the first induced current of the transmission coil may be enhanced and emitted externally under the influence of a second magnetic field formed by the plurality of second induced currents of the reducing coil.

According to another aspect, there is also provided an electromagnetic wave reducing apparatus including a reducing coil provided in a cylindrical structure at a position a predetermined distance spaced apart from one side of a transmission coil provided in a cylindrical structure for wireless power transmission, and a capacitor coupled to the reducing coil to adjust a resonant frequency formed at the reducing coil. A magnetic field formed by a first induced current that flows through the transmission coil in response to the wireless power transmission may be cancelled or enhanced and emitted by the reducing coil.

A distance from the same center of the cylindrical structures to the reducing coil may be greater than a distance from the same center of the cylindrical structures to the transmission coil.

A cross-sectional area of the cylindrical structure of the reducing coil may be greater than or less than a cross-sectional area of the cylindrical structure of the transmission coil.

The resonant frequency of the reducing coil may be adjusted by the capacitor such that the reducing coil resonates at a frequency lower than a harmonic of the magnetic field emitted by the transmission coil.

The reducing coil may form a second induced current that flows in an opposite direction to the first induced current generated at the transmission coil by the adjusted resonant frequency, and the magnetic field formed by the first induced current of the transmission coil may be cancelled and emitted externally under the influence of a magnetic field formed by the second induced current of the reducing coil.

The resonant frequency of the reducing coil may be adjusted by the capacitor such that the reducing coil resonates at a frequency higher than a harmonic of the magnetic field emitted by the transmission coil.

The reducing coil may form a second induced current that flows in the same direction as the first induced current generated at the transmission coil by the adjusted resonant frequency, and the magnetic field formed by the first induced current of the transmission coil may be enhanced and emitted externally under the influence of a magnetic field formed by the second induced current of the reducing coil.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
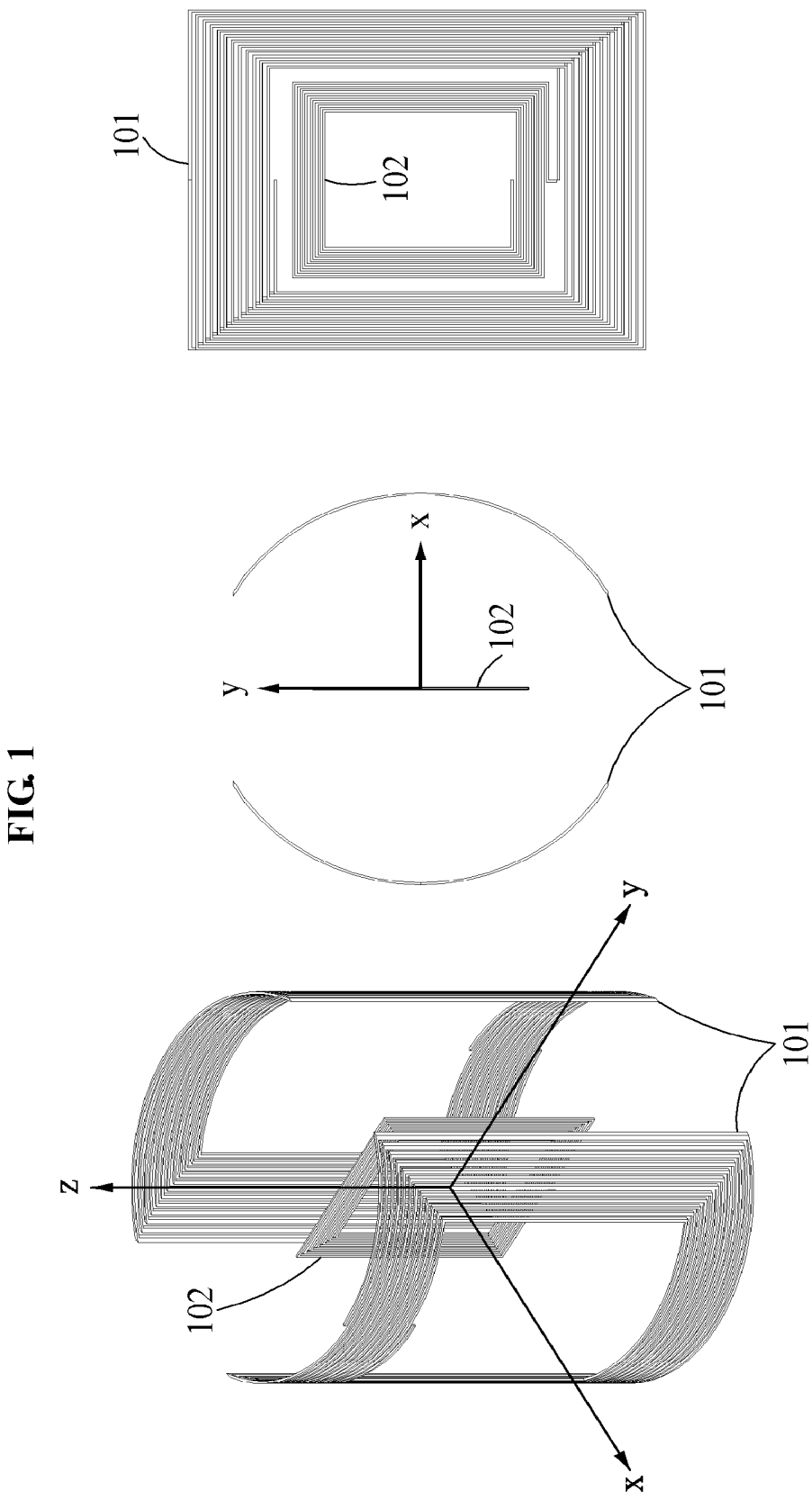
FIG. 1 illustrates structures of a transmission coil and a reception coil for wireless power transmission according to an example embodiment.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

FIG. 1 illustrates structures of a transmission coil and a reception coil for wireless power transmission according to an example embodiment.

In general, wireless power transmission technology is technology for wirelessly supplying energy (power) required for an electronic device without using a cable. For wireless power transmission, in general, a transmission circuit generates a square wave, amplifies the square wave, and transmits energy through a transmission coil 101. A reception coil 102 receives the energy in a free space, and accumulates the energy through a reception circuit (not shown) or charges a power source with a battery of the electronic device.

Referring to FIG. 1, the transmission coil 101 may have a cylindrical structure in which two coils face each other for wireless power transmission. For example, the transmission coil 101 may be disposed in a structure of cup holder in a free space.

Here, although not shown in the drawing, a pair of transmission coils 101 may be disposed on opposite sides relative to a z axis. That is, the transmission coil 101 may include two transmission coils provided in a cylindrical structure.

The reception coil 102 may be disposed between the two transmission coils 101 to receive energy for wireless charging. That is, a current may be formed at the reception coil 102 by an electromotive current induced by a magnetic field formed by a first induced current that flows through the transmission coil 101, and the reception coil 102 may accumulate energy corresponding to the formed current.

In this example, a transmission circuit (not shown) may generate a current corresponding to a square wave, and the transmission coil 101 may generate the first induced current by the square wave generated by the transmission circuit. Here, the square wave may be a current including a harmonic besides a basic frequency at which energy is to be transmitted. The transmission coil 101 may receive the current including the basic frequency and the harmonic by the square wave, and generate the first induced current by the received current. The transmission coil 101 may form a magnetic field by the generated first induced current. In this example, the transmission coil 101 may externally emit an unnecessary harmonic component besides a transmission frequency at which energy is to be transmitted, that is, the basic frequency.

Figure 3:
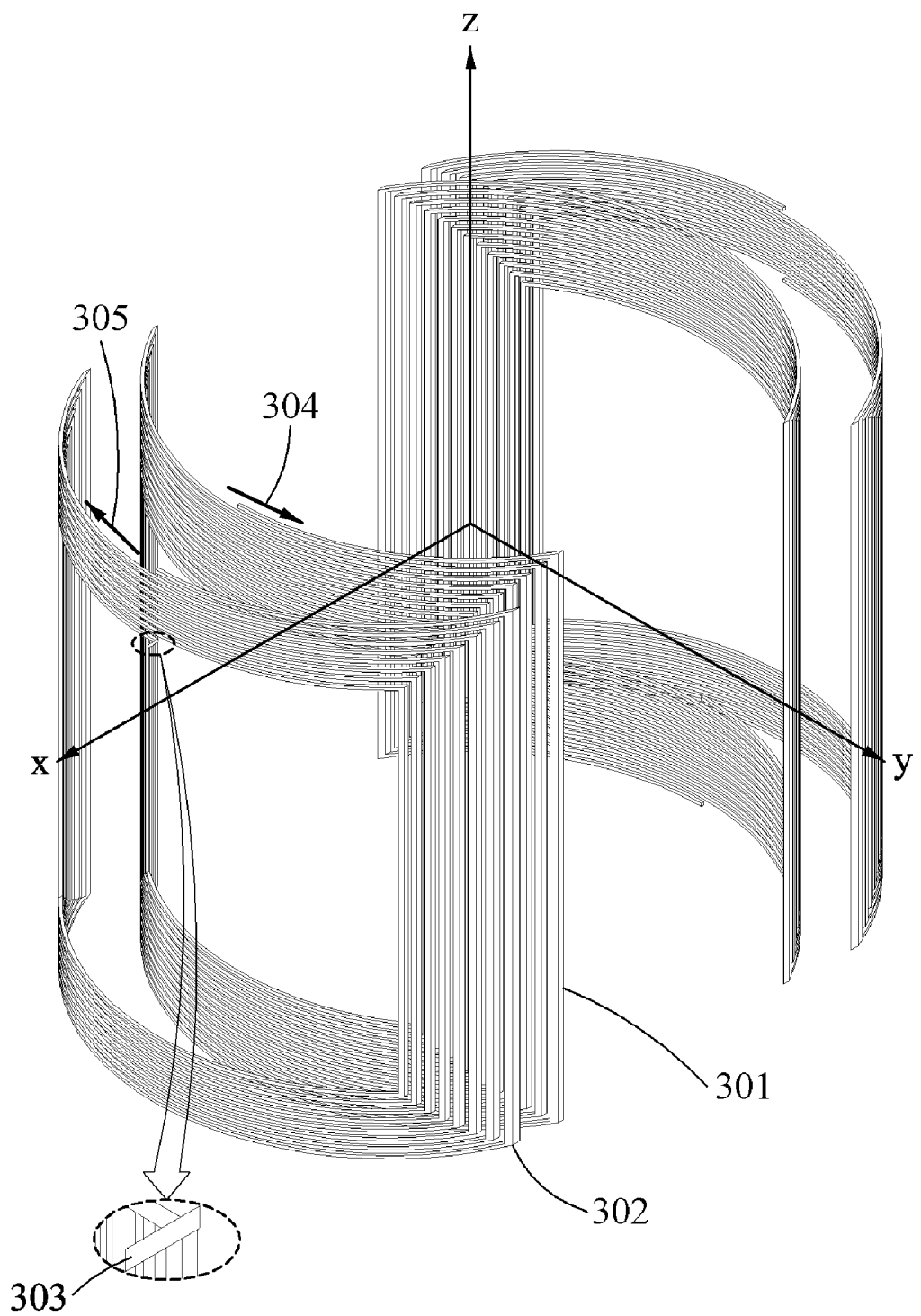
FIG. 3 illustrates a process of forming an induced current at a reducing coil based on an induced electromotive force according to an example embodiment.

The harmonic component may cause malfunction of a device by radiated emission and have an effect on interference in wireless power transmission. Thus, the present disclosure is suggested to reduce the externally emitted harmonic component using a reducing coil as shown in FIG. 3. A configuration for the same will be described further with reference to FIG. 3.

Figure 2:
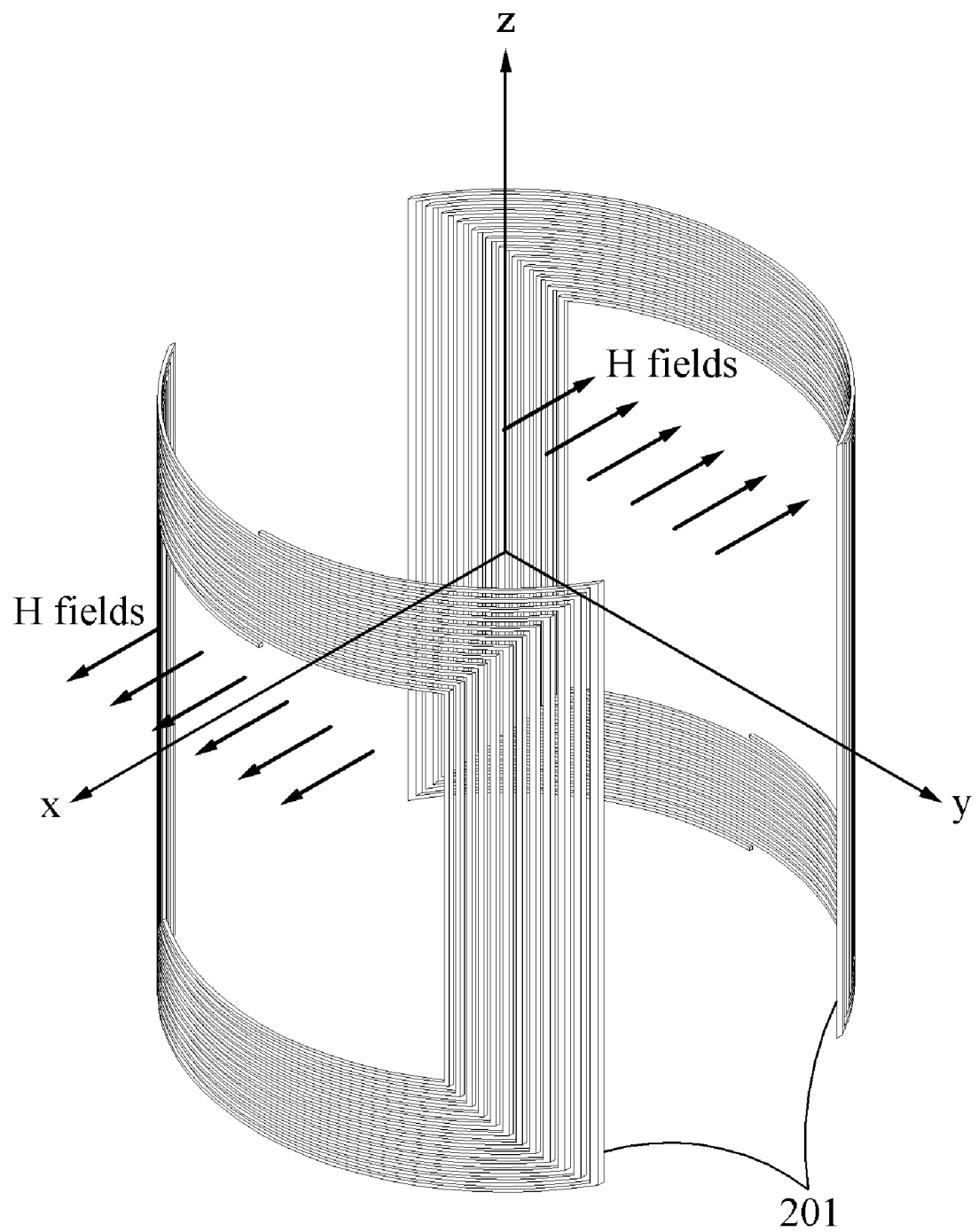
FIG. 2 illustrates a magnetic field distribution of a transmission coil having a cylindrical structure according to an example embodiment.

FIG. 2 illustrates a magnetic field distribution of a transmission coil having a cylindrical structure according to an example embodiment.

Referring to FIG. 2, a transmission coil 201 may be provided in a cylindrical structure. The transmission coil 201 may form a magnetic field by a first induced current that flows through the transmission coil 201. In this example, the magnetic field formed by the transmission coil 201 may transfer energy to a reception coil for wireless power transmission, and may be emitted outside of a free space. That is, the transmission coil 201 may externally emit the magnetic field from a center of the cylindrical structure.

In this example, the present disclosure suggests a method of reducing the magnetic field emitted by the transmission coil 201 using a reducing coil based on the principle that an induced electromotive force is generated. That is, a reducing coil having a cylindrical structure is disposed at a position spaced apart from one side of a transmission coil through which a first induced current flows, a reducing coil may form a second induced current in an opposite direction by the first induced current that flows through the transmission coil, and a magnetic field formed by the second induced current may cancel a magnetic field formed by the first induced current that flows through the transmission coil.

Hence, the present disclosure may cancel external emission of a harmonic component by radiated emission in a low frequency band of a transmission coil using a reducing coil, thereby satisfying a radiated emission strength limit for wireless power transmission.

FIG. 3 illustrates a process of forming an induced current at a reducing coil based on an induced electromotive force according to an example embodiment.

Referring to FIG. 3, an electromagnetic wave reducing apparatus may include a reducing coil 302 to cancel a magnetic field formed by a first induced current 304 that flows through a transmission coil 301 provided in a cylindrical structure for wireless power transmission, and a capacitor 303.

In detail, the reducing coil 302 may be provided in a cylindrical structure at a position a predetermined distance spaced apart from one side of the transmission coil 301 provided in the cylindrical structure for wireless power transmission. A second induced current 305 by an electromotive force induced by the first induced current 304 that flows through the transmission coil 301.

In this example, the capacitor 303 may be coupled to the reducing coil 302 to adjust a resonant frequency formed at the reducing coil 302. The reducing coil 302 may be coupled to the capacitor 303, whereby a structure of series resonant circuit may be provided. Thus, a current induced at the resonant frequency may be maximized. Further, the resonant frequency of the reducing coil 302 may be adjusted through the capacitor 303, whereby a frequency component to be decreased or increased may be selected from frequency components that flow through the reducing coil 302.

For example, the resonant frequency of the reducing coil 302 may be adjusted by the capacitor 303 such that the reducing coil 302 may resonate at a frequency lower than a third harmonic of the transmission coil 301. The reducing coil 302 may form a second induced current 305 that flows in an opposite direction to the first induced current 304 generated at the transmission coil 301 by the adjusted resonant frequency. The magnetic field formed by the first induced current 304 of the transmission coil 301 may be cancelled and emitted externally under the influence of a magnetic field formed by the second induced current 305 of the reducing coil 302.

That is, the magnetic field may be formed in the opposite direction to the magnetic field formed by the first induced current 304 of the transmission coil 301 by the second induced current 305 of the reducing coil 302, whereby the entire magnetic field emitted toward a free space may be cancelled.

Conversely, the resonant frequency of the reducing coil 302 may be adjusted by the capacitor 303 such that the reducing coil 302 may resonate at a frequency higher than the third harmonic of the transmission coil 301. The reducing coil 302 may form a second induced current 305 that flows in the same direction as the first induced current 304 generated at the transmission coil 301 by the adjusted resonant frequency. The magnetic field formed by the first induced current 304 of the transmission coil 301 may be enhanced and emitted externally under the influence of a magnetic field formed by the second induced current 305 of the reducing coil 302.

That is, the magnetic field may be formed in the same direction as the magnetic field formed by the first induced current 304 of the transmission coil 301 by the second induced current 305 of the reducing coil 302, whereby the entire magnetic field emitted toward a free space may be enhanced.

Hence, the present disclosure may control the capacitor 303 of the reducing coil 302 to select a frequency that flows through the reducing coil 302, thereby reducing harmonic radiated emission. That is, the reducing coil 302 may be coupled to the capacitor 303, whereby a structure of series resonant circuit may be provided, and thus a resonant frequency Q of the reducing coil 302 may exist. The resonant frequency Q of the reducing coil 302 may cause a limit to a frequency band in which an electromagnetic wave is to be reduced.

For example, if Q is high, a frequency domain in which an electromagnetic wave is to be reduced by the resonant frequency may become narrow. However, the electromagnetic wave may be greatly reduced at the resonant frequency of the reducing coil 302. Conversely, if Q is low, the frequency domain in which an electromagnetic wave is to be reduced by the resonant frequency of the reducing coil 302 may become wide. However, the electromagnetic wave may be scarcely reduced at the resonant frequency of the reducing coil 302. This characteristic may be effective to selectively reduce harmonic radiated emission.

Figure 4:
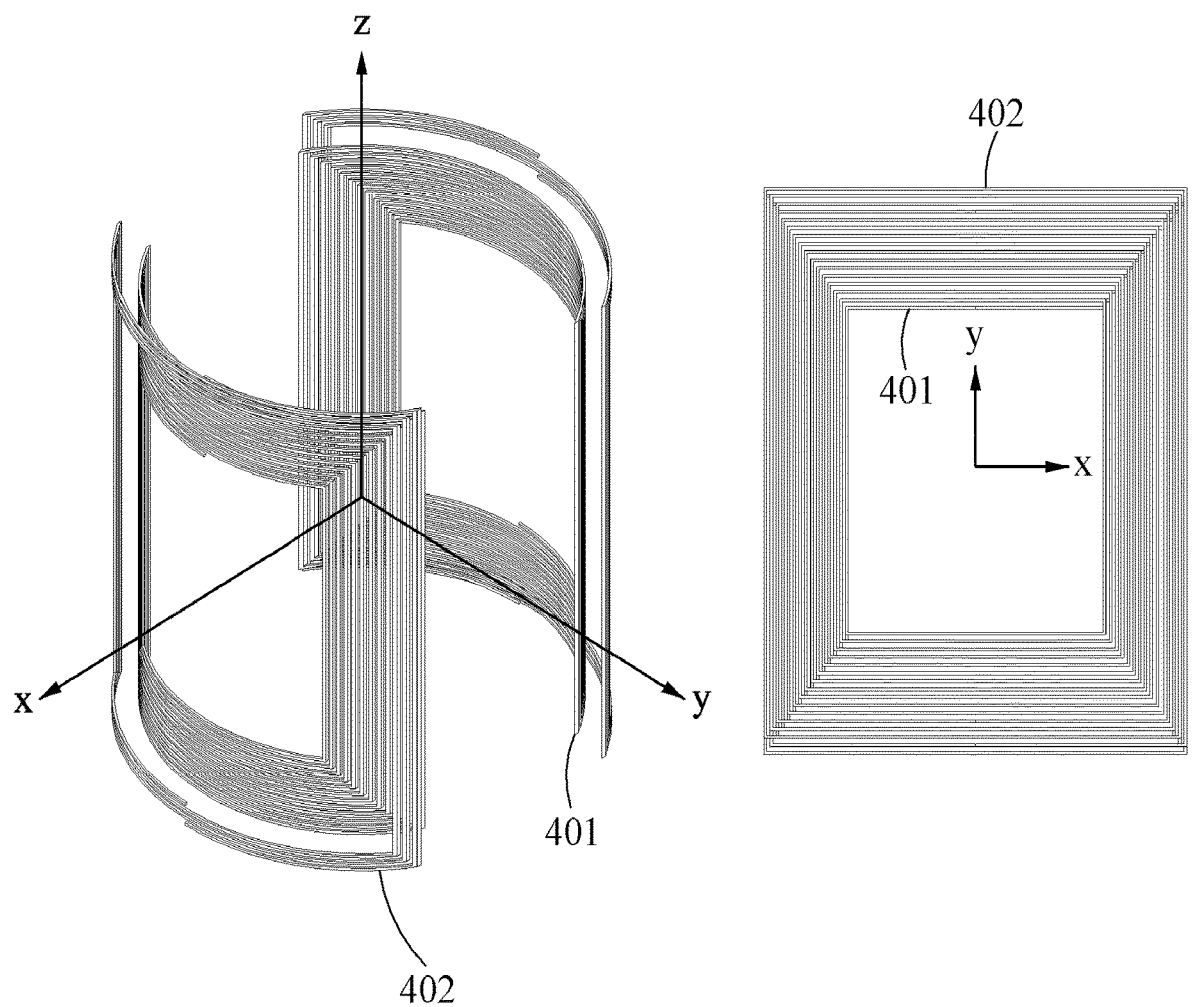
FIG. 4 illustrates a shape of a reducing coil disposed a predetermined distance spaced apart from a transmission coil according to an example embodiment.

FIG. 4 illustrates a shape of a reducing coil disposed a predetermined distance spaced apart from a transmission coil according to an example embodiment.

Referring to FIG. 4, a reducing coil 402 may be implemented in a bended cylindrical structure that encloses a cup holder-shaped structure of a transmission coil 401. In this example, a cross-sectional area of the cylindrical structure of the reducing coil 402 may be greater than a cross-sectional area of the cylindrical structure of the transmission coil 401. That is, the reducing coil 402 may be implemented to have a greater area than the transmission coil 401 such that the reducing coil 402 may enclose the entire transmission coil 401. The reducing coil 402 may easily form a second induced current that flows through the reducing coil 402, thereby achieving a great effect of reducing a magnetic field emitted from the transmission coil 401.

A resonant frequency of the reducing coil 402 may be adjusted by a capacitor such that the reducing coil 402 may resonate at a frequency lower than a harmonic of the magnetic field emitted by the transmission coil 401. That is, the present disclosure may select a frequency band to be cancelled in a magnetic field emitted from a transmission coil through a reducing coil.

The reducing coil 402 may form a second induced current that flows in an opposite direction to a first induced current generated at the transmission coil 401 by the adjusted resonant frequency, and a magnetic field formed by the first induced current of the transmission coil 401 may be cancelled and emitted externally under the influence of a magnetic field formed by the second induced current of the reducing coil 402.

Conversely, to extend the frequency band of the externally emitted magnetic field, the resonant frequency of the reducing coil 402 may be adjusted by the capacitor such that the reducing coil 402 may resonate at a frequency higher than the harmonic of the magnetic field emitted by the transmission coil 401. The reducing coil 402 may form a second induced current that flows in the same direction as the first induced current generated at the transmission coil 401 by the adjusted resonant frequency, and the magnetic field formed by the first induced current of the transmission coil 401 may be enhanced and emitted externally under the influence of a magnetic field formed by the second induced current of the reducing coil 402. That is, the present disclosure may adjust the resonant frequency of the reducing coil 402 to be relatively high, thereby selecting a frequency band to be enhanced in the magnetic field emitted by the transmission coil 401 through the reducing coil 402.

Figure 5:
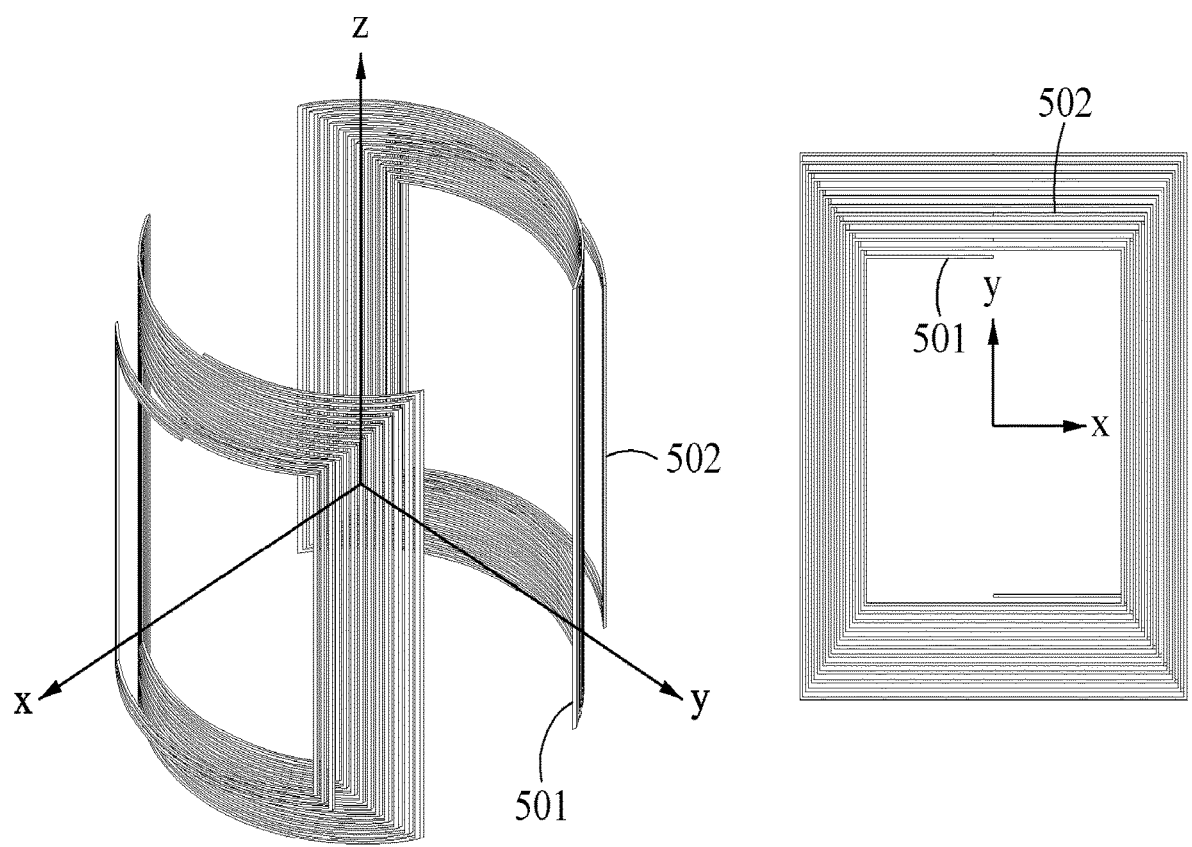
FIG. 5 illustrates a shape of a reducing coil disposed a predetermined distance spaced apart from a transmission coil according to an example embodiment.

FIG. 5 illustrates a shape of a reducing coil disposed a predetermined distance spaced apart from a transmission coil according to an example embodiment.

Referring to FIG. 5, a reducing coil 502 may be implemented in a bended cylindrical structure that encloses a cup holder-shaped structure of a transmission coil 501. In this example, a cross-sectional area of the cylindrical structure of the reducing coil 502 may be less than a cross-sectional area of the cylindrical structure of the transmission coil 501. That is, the reducing coil 502 may be implemented in a structure that encloses an area in which a magnetic field generated from the transmission coil 501 is strongly formed. In this example, the reducing coil 502 may be implemented to have a smaller area of the transmission coil 401 of FIG. 4, whereby a size of the entire structure may be reduced when compared to the structure of FIG. 4 while the effect of reducing an electromagnetic wave may be maintained.

A resonant frequency of the reducing coil 502 may be adjusted by a capacitor such that the reducing coil 502 may resonate at a frequency lower than a harmonic of a magnetic field emitted by the transmission coil 501. The reducing coil 502 may form a second induced current that flows in an opposite direction to a first induced current generated at the transmission coil 501 by the adjusted resonant frequency, and a magnetic field formed by the first induced current of the transmission coil 501 may be cancelled and emitted externally under the influence of a magnetic field formed by the second induced current of the reducing coil 502.

Conversely, the resonant frequency of the reducing coil 502 may be adjusted by the capacitor such that the reducing coil 502 may resonate at a frequency higher than the harmonic of the magnetic field emitted by the transmission coil 501. The reducing coil 502 may form a second induced current that flows in the same direction as the first induced current generated at the transmission coil 501 by the adjusted resonant frequency, and the magnetic field formed by the first induced current of the transmission coil 501 may be enhanced and emitted externally under the influence of a magnetic field formed by the second induced current of the reducing coil 502.

Hence, the present disclosure may adjust the resonant frequency of the reducing coil 502 through the capacitor, thereby selecting a frequency band to be cancelled or enhanced in the magnetic field emitted by the transmission coil 501.

Figure 6:
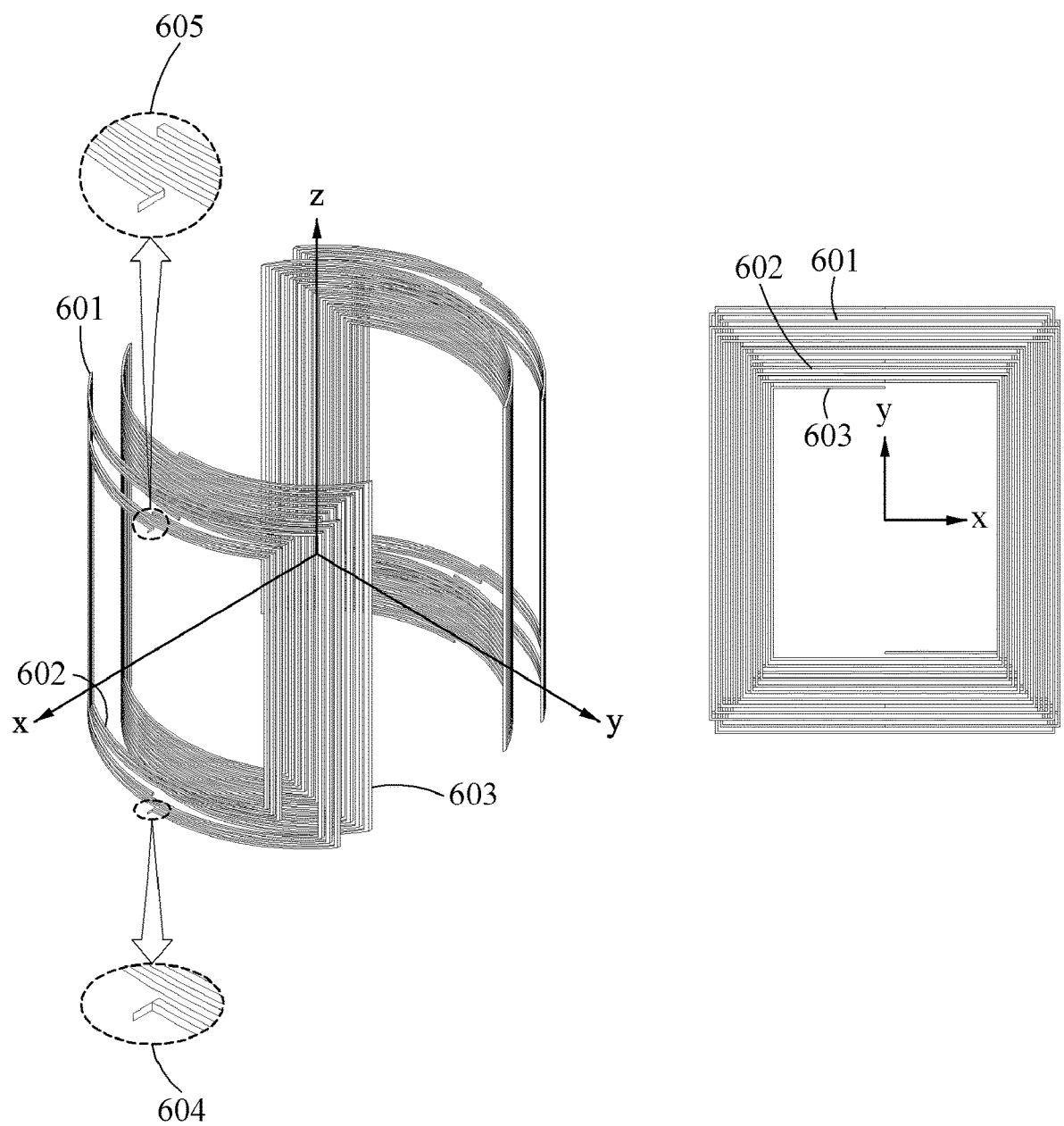
FIG. 6 illustrates an operation of cancelling a plurality of magnetic fields using a plurality of reducing coils according to an example embodiment.

FIG. 6 illustrates an operation of cancelling a plurality of magnetic fields using a plurality of reducing coils according to an example embodiment.

Referring to FIG. 6, an electromagnetic wave reducing apparatus may reduce an electromagnetic wave with respect to a multi-frequency band to extend an electromagnetic wave reduction frequency band that is restricted by a resonant frequency Q of a reducing coil. In detail, the electromagnetic wave reducing apparatus may include a first reducing coil 601, a second reducing coil 602, a first capacitor 604, and a second capacitor 605 to reduce the electromagnetic wave with respect to the multi-frequency band.

The first reducing coil 601 and the second reducing coil 602 may be provided in a cylindrical structure at a position a predetermined spaced apart from one side of a transmission coil 603 provided in a cylindrical structure for wireless power transmission. Distances from the same center of the cylindrical structures to the first reducing coil 601 and the second reducing coil 602 may be greater than a distance from the same center of the cylindrical structures to the transmission coil 603.

A cross-sectional area of the cylindrical structure of the first reducing coil 601 may be greater than a cross-sectional area of the cylindrical structure of the second reducing coil 602. That is, the first reducing coil 601 and the second reducing coil 602 may be disposed collinearly in a Z-axial direction and implemented in different sizes, thereby reducing the electromagnetic wave with respect to the multi-frequency band.

The first capacitor 604 may be coupled to the first reducing coil 601 to adjust a first resonant frequency formed at the first reducing coil 601, and the second capacitor 605 may be coupled to the second reducing coil 602 to adjust a second resonant frequency formed at the second reducing coil 602.

The electromagnetic wave reducing apparatus may adjust the respective resonant frequencies of the first reducing coil 601 and the second reducing coil 602 to reduce the multi-frequency magnetic field emitted by the transmission coil 603, using the first capacitor 604 and the second capacitor 605 coupled to the first reducing coil 601 and the second reducing coil 602, respectively, thereby reducing the magnetic field of a frequency band to be cancelled.

In detail, the first resonant frequency of the first reducing coil 601 may be adjusted by the first capacitor 604 such that the first reducing coil 601 may resonate at a frequency lower than a harmonic of a first magnetic field emitted by the transmission coil 603, and the second resonant frequency of the second reducing coil 602 may be adjusted by the second capacitor 605 such that the second reducing coil 602 may resonate at a frequency lower than a harmonic of a second magnetic field emitted by the transmission coil 603. Here, the harmonic of the second magnetic field may have a shorter variation of period than the harmonic of the first magnetic field.

In an example, the first reducing coil 601 may be disposed more inside than the second reducing coil 602, and may be controlled by the first capacitor 604 to resonate at a frequency lower than a third harmonic of the magnetic field of the transmission coil 603. The second reducing coil 602 may be disposed more outside than the first reducing coil, and may be controlled by the second capacitor 605 to resonate at a frequency lower than a fifth harmonic of the magnetic field of the transmission coil 603.

The first reducing coil 601 may form a second induced current that flows in an opposite direction to a first induced current generated at the transmission coil 603 by the adjusted first resonant frequency, and a first magnetic field formed by the first induced current of the transmission coil 603 may be cancelled and emitted externally under the influence of a third magnetic field formed by the second induced current of the first reducing coil 601. Further, the second reducing coil 602 may form a third induced current that flows in an opposite direction to the first induced current generated at the transmission coil 603 by the adjusted second resonant frequency.

Hence, the electromagnetic wave reducing apparatus may control the resonant frequencies of the first reducing coil 601 and the second reducing coil 602 to be lower than the harmonic of the first magnetic field and the harmonic of the second magnetic field, thereby reducing the magnetic field of the multi-frequency band to be cancelled.

Conversely, to extend a magnetic field in a predetermined frequency domain, the electromagnetic wave reducing apparatus may adjust the respective resonant frequency of the first reducing coil 601 and the second reducing coil 602 to be high, thereby extending the magnetic field of the multi-frequency band to be enhanced.

That is, the resonant frequency of the first reducing coil 601 may be adjusted by the first capacitor 604 to be higher than a harmonic of the first magnetic field emitted by the transmission coil 603. The resonant frequency of the second reducing coil 602 may be adjusted by the second capacitor 605 to be higher than a harmonic of the second magnetic field emitted by the transmission coil 603.

The first reducing coil 601 may form a second induced current that flows in the same direction as the first induced current generated at the transmission coil 603 by the adjusted resonant frequency, and the first magnetic field formed by the first induced current of the transmission coil 603 may be enhanced and emitted externally under the influence of a third magnetic field formed by the second induced current of the first reducing coil 601.

The second reducing coil 602 may form a third induced current that flows in the same direction as the first induced current generated at the transmission coil 603 by the adjusted resonant frequency, and the second magnetic field formed by the first induced current of the transmission coil 603 may be enhanced and emitted externally under the influence of a fourth magnetic field formed by the third induced current of the second reducing coil 602.

Hence, the present disclosure may control respective resonant frequencies of a plurality of reducing coils through a plurality of capacitors, thereby selecting a frequency band of a magnetic field to be cancelled or enhanced with respect to the multi-frequency magnetic field emitted by the transmission coil 603.

Figure 7:
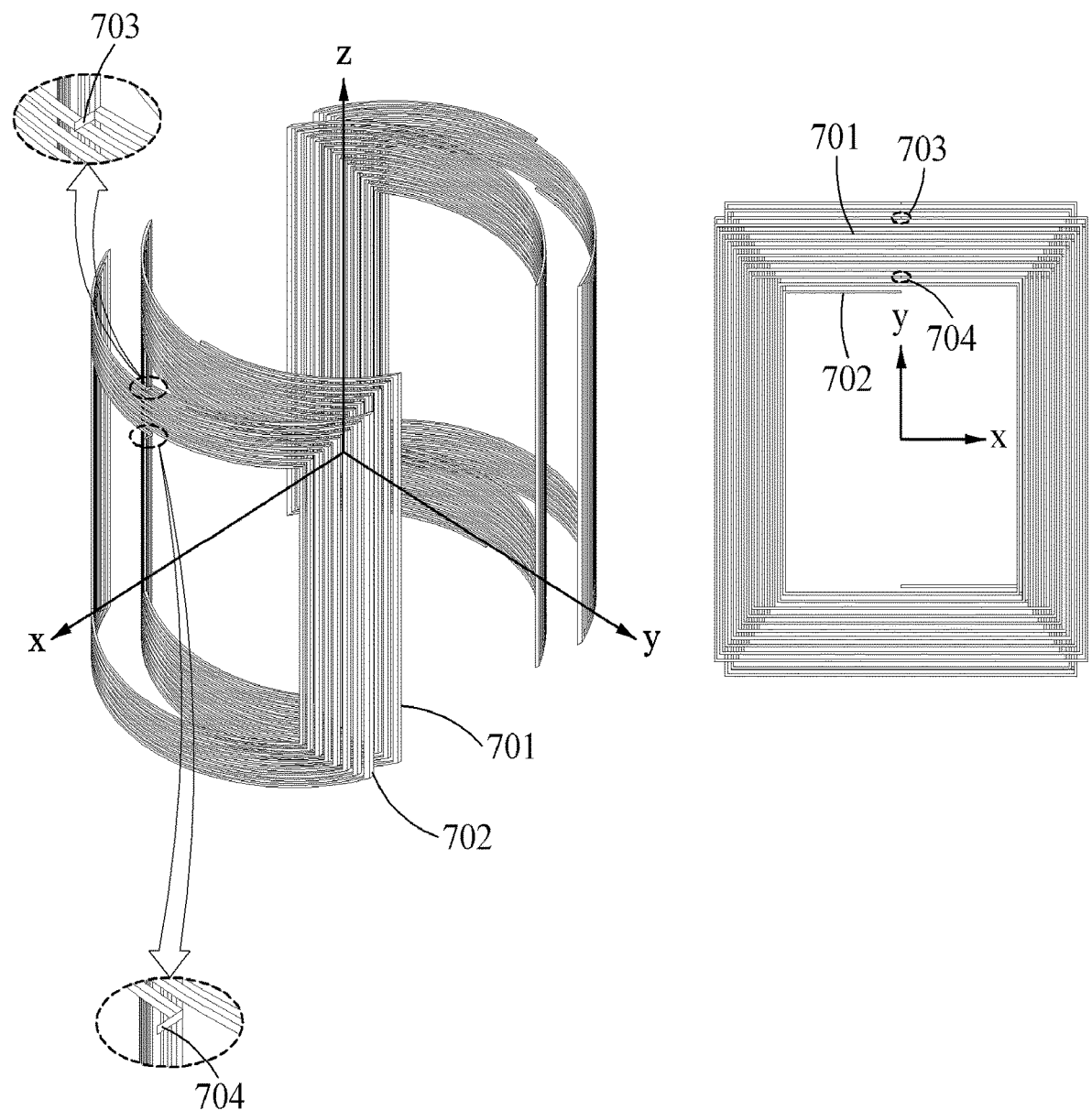
FIG. 7 illustrates an operation of cancelling a plurality of magnetic fields using a single reducing coil according to an example embodiment.

FIG. 7 illustrates an operation of cancelling a plurality of magnetic fields using a single reducing coil according to an example embodiment.

Referring to FIG. 7, an electromagnetic wave reducing apparatus may include a reducing coil 702, a first capacitor 703, and a second capacitor 704 to reduce an electromagnetic wave with respect to a multi-frequency band.

The reducing coil 702 may be provided in a cylindrical structure at a position a predetermined spaced apart from one side of a transmission coil 701 provided in a cylindrical structure for wireless power transmission. The first capacitor 703 may be coupled to an inductance of the reducing coil 702 to adjust a first resonant frequency formed at the reducing coil 702. The second capacitor 704 may be connected in series to the first capacitor 703 to adjust a second resonant frequency formed at the reducing coil 702. In this example, the electromagnetic wave reducing apparatus may cancel a multi-frequency magnetic field emitted by the transmission coil 701 using multiple capacitors of the single reducing coil 702.

Further, the electromagnetic wave reducing apparatus of FIG. 7 may use the inductance of the reducing coil 702 in common to adjust the resonant frequencies through the first capacitor 703 and the second capacitor 704 being connected in series, thereby selectively cancelling the multi-magnetic field to be decreased.

The first resonant frequency of the reducing coil 702 may be adjusted by the first capacitor 703 such that the reducing coil 702 may resonate at a frequency lower than a first harmonic of a magnetic field formed by a first induced current, and the second resonant frequency of the reducing coil 702 may be adjusted by the second capacitor 704 such that the reducing coil 702 may resonates at a frequency lower than a second harmonic of the magnetic field formed by the first induced current. Here, the second harmonic of the magnetic field may have a shorter variation of period than the first harmonic of the magnetic field.

In an example, the first resonant frequency of the reducing coil 702 may be adjusted by the first capacitor 703 such that the reducing coil 702 may resonate at a frequency lower than a third harmonic of the magnetic field of the transmission coil 701, and the second resonant frequency of the reducing coil 702 may be adjusted by the second capacitor 704 such that the reducing coil 702 may resonate at a frequency lower than a fifth harmonic of the magnetic field of the transmission coil 701. Here, the third harmonic may refer to a frequency three times a basic harmonic, and the fifth harmonic may refer to a frequency five times the basic harmonic.

The reducing coil 702 may form a plurality of second induced currents that flow in an opposite direction to the first induced current generated at the transmission coil 701 by the adjusted first resonant frequency and the adjusted second resonant frequency, and a first magnetic field formed by the first induced current of the transmission coil 701 may be cancelled and emitted externally under the influence of a second magnetic field formed by the plurality of second induced currents of the reducing coil 702.

Hence, the electromagnetic wave reducing apparatus may adjust the first resonant frequency and the second resonant frequency such that the reducing coil 702 may resonate at a frequency lower than the first harmonic and the second harmonic of the magnetic field, thereby reducing the magnetic field of the multi-frequency band to be cancelled.

Conversely, to extend the magnetic field in a predetermined frequency domain, the electromagnetic wave reducing apparatus may adjust the first resonant frequency and the second resonant frequency of the reducing coil 702 to be relatively high, thereby extending the magnetic field of the multi-frequency band to be enhanced.

Conversely, the first resonant frequency of the reducing coil 702 may be adjusted by the first capacitor 703 such that the reducing coil 702 may resonate at a frequency higher than the first harmonic of the magnetic field formed by the first induced current, and the second resonant frequency of the reducing coil 702 may be adjusted by the second capacitor 704 such that the reducing coil 702 may resonates at a frequency higher than the second harmonic of the magnetic field formed by the first induced current.

The reducing coil 702 may form a plurality of second induced currents that flow in the same direction as the first induced current generated at the transmission coil 701 by the adjusted first resonant frequency and the adjusted second resonant frequency, and the first magnetic field formed by the first induced current of the transmission coil 701 may be enhanced and emitted externally under the influence of the second magnetic field formed by the plurality of second induced currents of the reducing coil 702.

Figure 8:
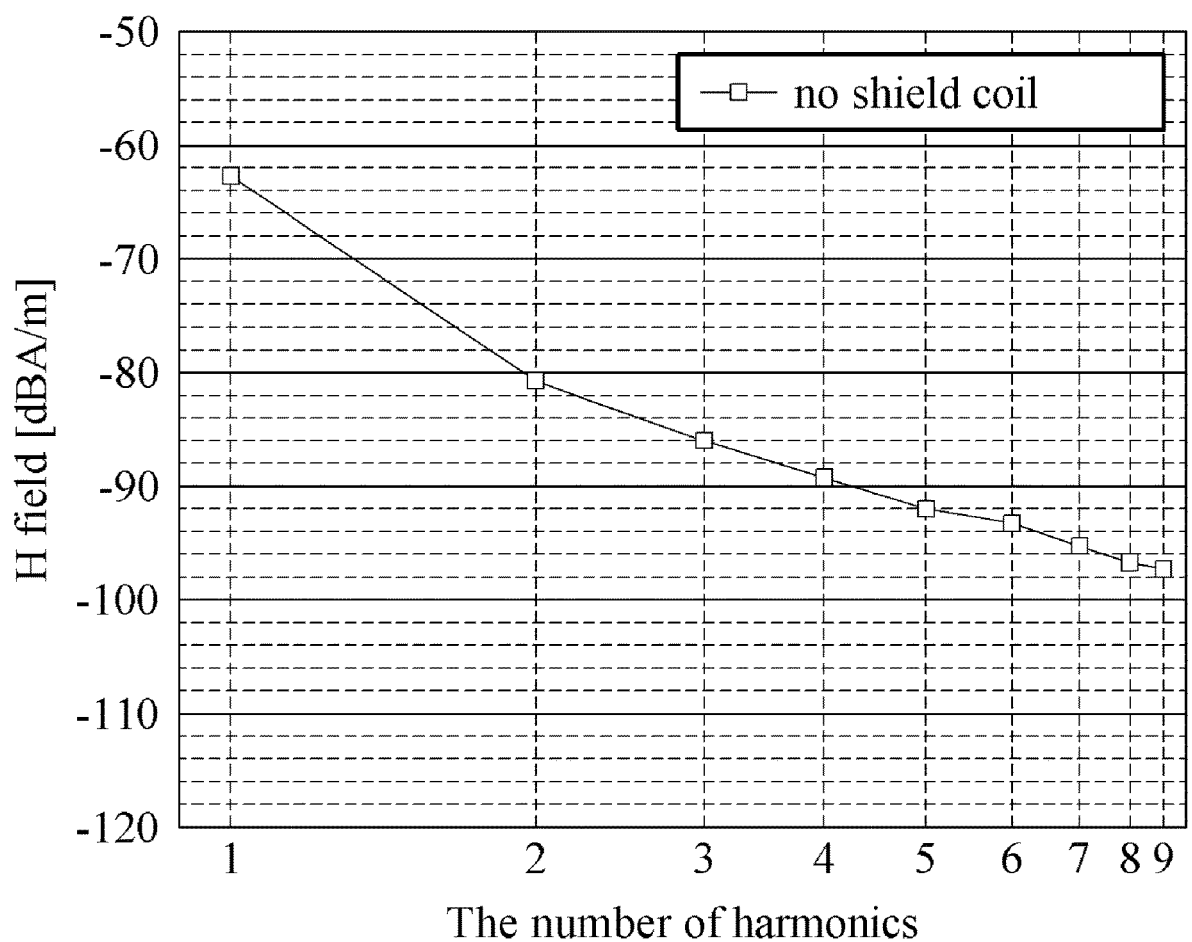
FIG. 8 is a graph illustrating magnetic field emission levels from a basic harmonic to a ninth harmonic according to an example embodiment.

FIG. 8 is a graph illustrating magnetic field emission levels from a basic harmonic to a ninth harmonic according to an example embodiment.

The graph of FIG. 8 shows a result of measuring a magnetic field formed and emitted by a transmission coil before a reducing coil constituting an electromagnetic wave reducing apparatus is applied. In this example, the graph may represent emission levels of the magnetic field from a basic harmonic to a ninth harmonic.

Figure 9:
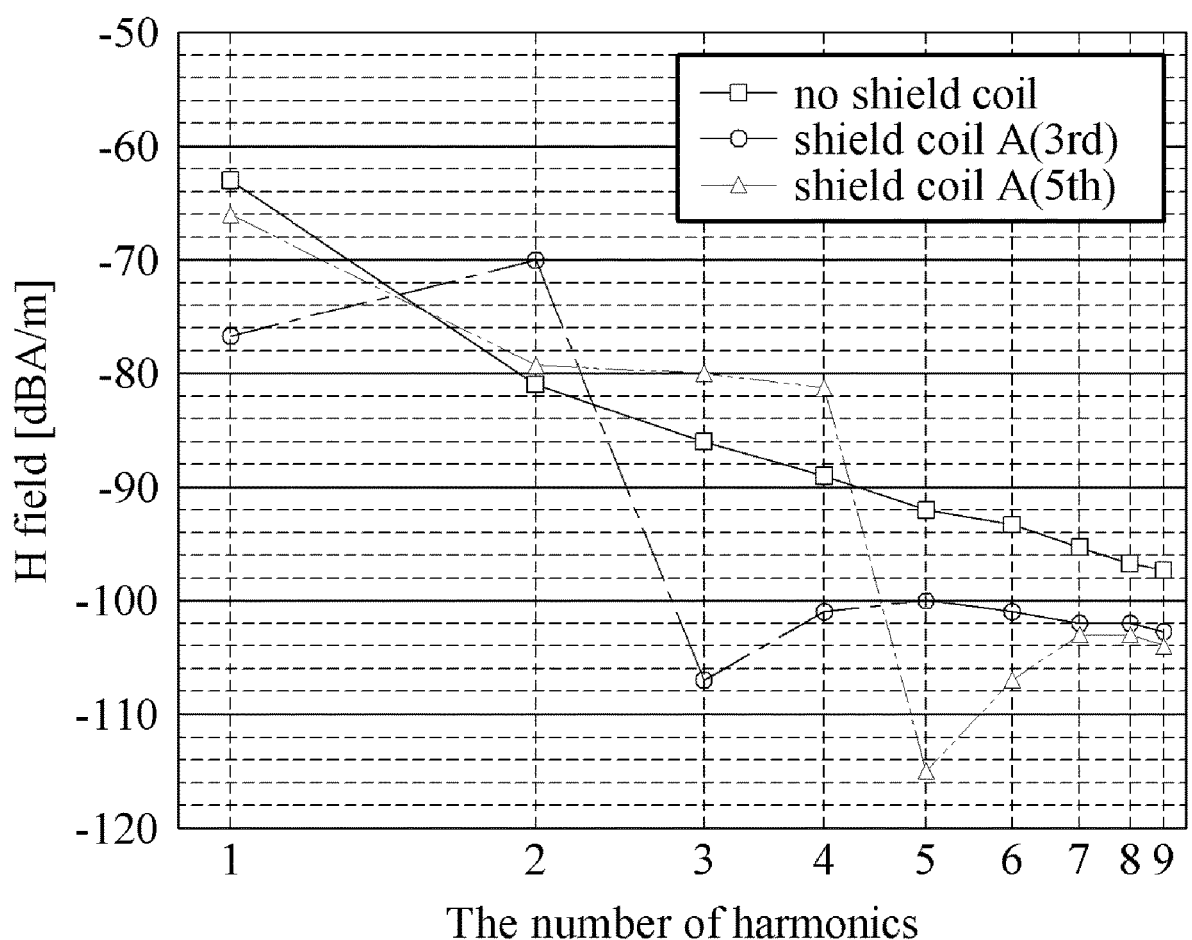
FIG. 9 is a graph illustrating an effect of reducing a harmonic using a reducing coil in a structure of an electromagnetic wave reducing apparatus of FIG. 4 according to an example embodiment.

FIG. 9 is a graph illustrating an effect of reducing a harmonic using a reducing coil in a structure of an electromagnetic wave cancelling apparatus of FIG. 4 according to an example embodiment.

The graph of FIG. 9 shows an effect of cancelling a magnetic field formed and emitted by a transmission coil using a reducing coil constituting the electromagnetic wave reducing apparatus of FIG. 4.

A line marked with circular dots shows a result of adjusting a resonant frequency of a reducing coil to reduce a third harmonic, and a line marked with triangular dots shows a result of adjusting a resonant frequency of a reducing coil to reduce a fifth harmonic. As shown in the graph, when the reducing coil is used, an electromagnetic wave may be reduced by at least −21 dB with respect to the third harmonic, and an electromagnetic wave may be reduced by at least −23 dB with respect to the fifth harmonic.

Figure 10:
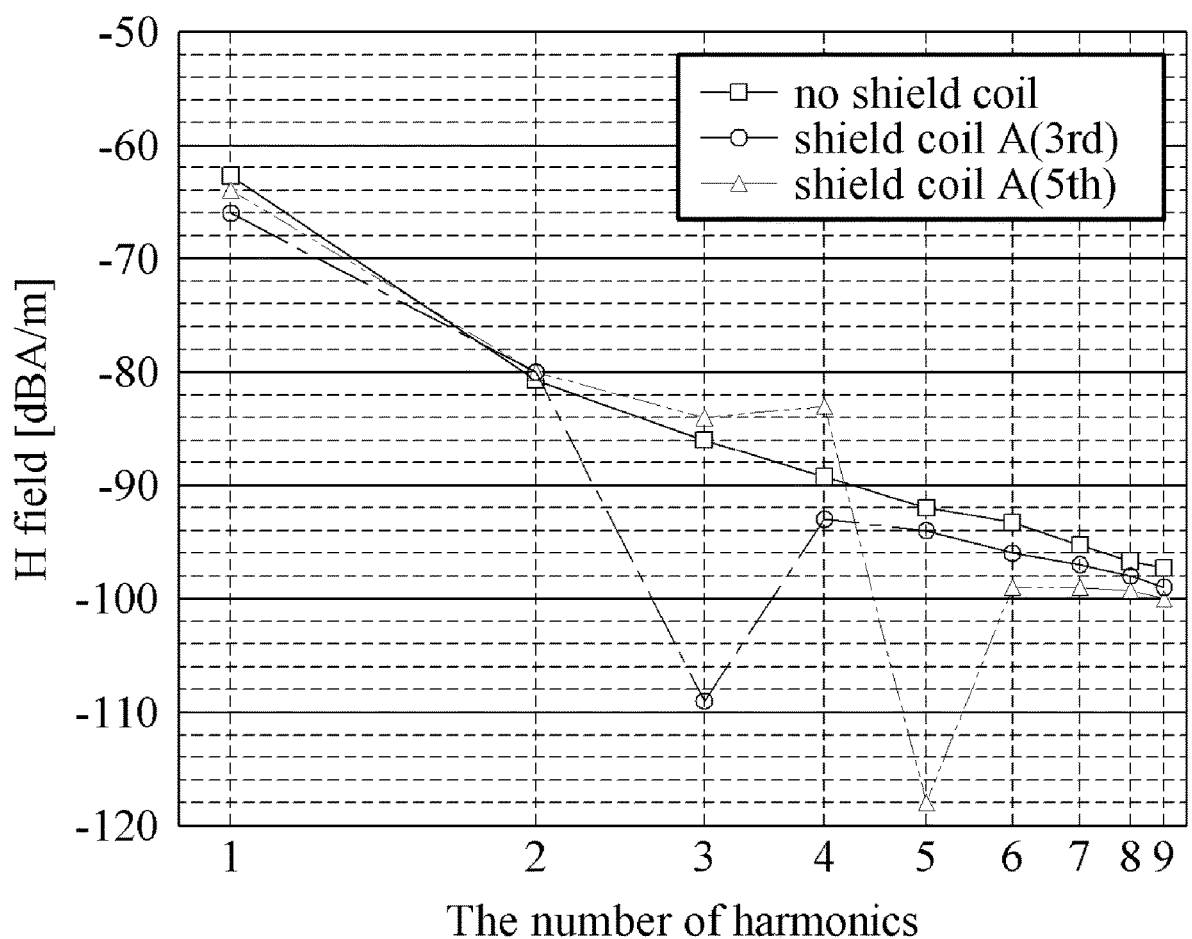
FIG. 10 is a graph illustrating an effect of reducing a harmonic using a reducing coil in a structure of an electromagnetic wave reducing apparatus of FIG. 5 according to an example embodiment.

FIG. 10 is a graph illustrating an effect of reducing a harmonic using a reducing coil in a structure of an electromagnetic wave cancelling apparatus of FIG. 5 according to an example embodiment.

The graph of FIG. 10 shows an effect of cancelling a magnetic field formed and emitted by a transmission coil using a reducing coil constituting the electromagnetic wave reducing apparatus of FIG. 5.

A line marked with circular dots shows a result of adjusting a resonant frequency of a reducing coil to reduce a third harmonic, and a line marked with triangular dots shows a result of adjusting a resonant frequency of a reducing coil to reduce a fifth harmonic. As shown in the graph, when the reducing coil is used, an electromagnetic wave may be reduced by at least −23 dB with respect to the third harmonic, and an electromagnetic wave may be reduced by at least −26 dB with respect to the fifth harmonic.

Figure 11:
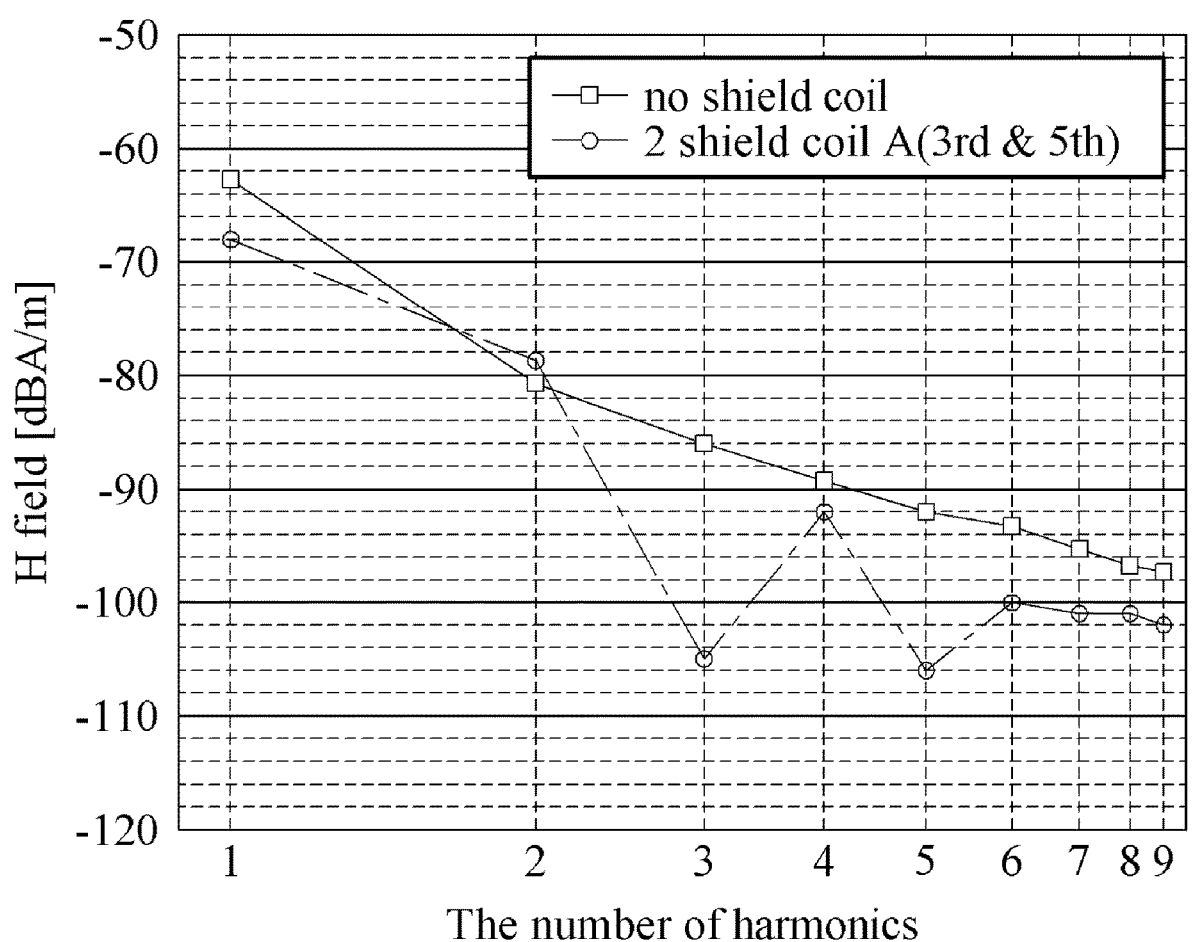
FIG. 11 is a graph illustrating an effect of reducing a harmonic using a reducing coil in a structure of an electromagnetic wave reducing apparatus of FIG. 6 according to an example embodiment.

FIG. 11 is a graph illustrating an effect of reducing a harmonic using a reducing coil in a structure of an electromagnetic wave cancelling apparatus of FIG. 6 according to an example embodiment.

The graph of FIG. 11 shows an effect of cancelling a multi-frequency magnetic field formed and emitted by a transmission coil using a first reducing coil and a second reducing coil constituting the electromagnetic wave reducing apparatus of FIG. 6.

The graph shows a result of adjusting a resonant frequency of the first reducing coil to reduce a third harmonic and adjusting a resonant frequency of the second reducing coil to reduce a fifth harmonic. An electromagnetic wave may be reduced by at least −19 dB with respect to the third harmonic, and an electromagnetic wave may be reduced by at least −14 dB with respect to the fifth harmonic.

Figure 12:
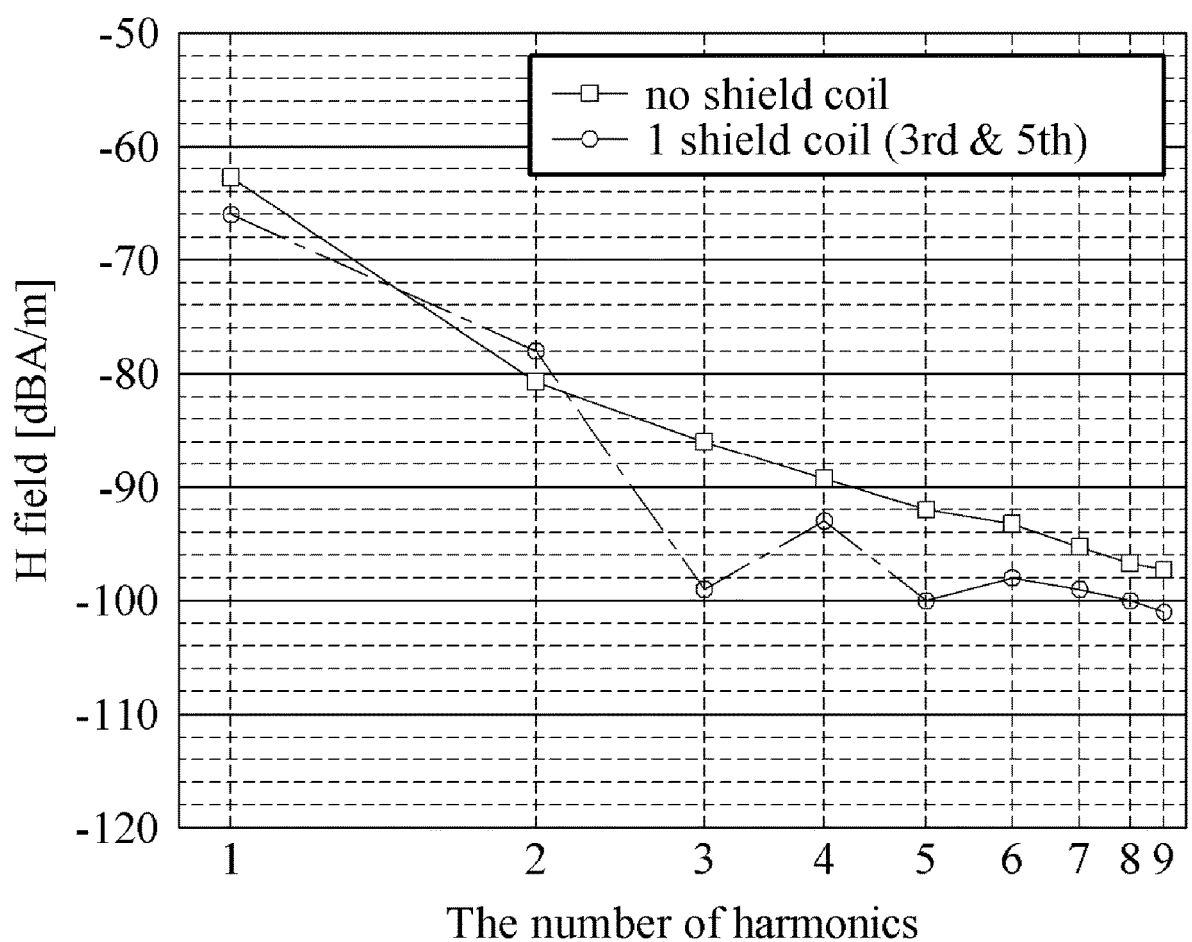
FIG. 12 is a graph illustrating an effect of reducing a harmonic using a reducing coil in a structure of an electromagnetic wave reducing apparatus of FIG. 7 according to an example embodiment.

FIG. 12 is a graph illustrating an effect of reducing a harmonic using a reducing coil in a structure of an electromagnetic wave cancelling apparatus of FIG. 7 according to an example embodiment.

The graph of FIG. 12 shows an effect of cancelling a multi-frequency magnetic field formed and emitted by a transmission coil using a reducing coil constituting the electromagnetic wave reducing apparatus of FIG. 7.

The graph shows a result of adjusting a first resonant frequency of the reducing coil through a first capacitor to reduce a third harmonic and adjusting a second resonant frequency of the reducing coil through a second capacitor to reduce a fifth harmonic. An electromagnetic wave may be reduced by at least −13 dB with respect to the third harmonic, and an electromagnetic wave may be reduced by at least −8 dB with respect to the fifth harmonic.

According to an embodiment, an electromagnetic wave reducing apparatus may selectively adjust an externally emitted harmonic using a reducing coil to satisfy a strength limit with respect to radiated emission reduction in a low frequency band, thereby reducing harmonic radiated emission and multi-harmonic radiated emission.

The components described in the exemplary embodiments of the present invention may be achieved by hardware components including at least one DSP (Digital Signal Processor), a processor, a controller, an ASIC (Application Specific Integrated Circuit), a programmable logic element such as an FPGA (Field Programmable Gate Array), other electronic devices, and combinations thereof. At least some of the functions or the processes described in the exemplary embodiments of the present invention may be achieved by software, and the software may be recorded on a recording medium. The components, the functions, and the processes described in the exemplary embodiments of the present invention may be achieved by a combination of hardware and software.

The processing device described herein may be implemented using hardware components, software components, and/or a combination thereof. For example, the processing device and the component described herein may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An electromagnetic wave reducing apparatus, comprising:
a first reducing coil and a second reducing coil provided in a cylindrical structure at a position a predetermined distance spaced apart from one side of a transmission coil for wireless power transmission, the transmission coil forming a first magnetic field and a second magnetic field by a first induced current that flows through the transmission coil in response to the wireless power transmission;
a first capacitor coupled to the first reducing coil to adjust a first resonant frequency formed at the first reducing coil; and a second capacitor coupled to the second reducing coil to adjust a second resonant frequency formed at the second reducing coil, wherein the first resonant frequency of the first reducing coil is adjusted by the first capacitor such that the first reducing coil resonates at a frequency lower than a harmonic of the first magnetic field emitted by the transmission coil, the second resonant frequency of the second reducing coil is adjusted by the second capacitor such that the second reducing coil resonates at a frequency lower than a harmonic of the second magnetic field emitted by the transmission coil, wherein the first reducing coil forms a second induced current that flows in an opposite direction to the first induced current generated at the transmission coil by the adjusted first resonant frequency, and the first magnetic field formed by the first induced current of the transmission coil is changed based on a third magnetic field formed by the second induced current of the first reducing coil.

2. The electromagnetic wave reducing apparatus of claim 1, wherein distances from the same center of the cylindrical structures to the first reducing coil and the second reducing coil are greater than a distance from the same center of the cylindrical structures to the transmission coil.

3. The electromagnetic wave reducing apparatus of claim 1, wherein a cross-sectional area of the cylindrical structure of the first reducing coil is greater than a cross-sectional area of the cylindrical structure of the second reducing coil.

4. The electromagnetic wave reducing apparatus of claim 1, wherein the harmonic of the second magnetic field has a shorter variation of period than the harmonic of the first magnetic field.

5. The electromagnetic wave reducing apparatus of claim 4, wherein the second reducing coil forms a third induced current that flows in an opposite direction to the first induced current generated by the transmission coil by the adjusted second resonant frequency, and the second magnetic field formed by the first induced current of the transmission coil is changed based on a fourth magnetic field formed by the third induced current of the second reducing coil.

6. An electromagnetic wave reducing apparatus, comprising:

a reducing coil at a position a predetermined distance spaced apart from a transmission coil provided for wireless power transmission;

a first capacitor connected to an inductance of the reducing coil to adjust a first resonant frequency formed at the reducing coil; and a second capacitor connected in series to the first capacitor to adjust a second resonant frequency formed at the reducing coil, wherein the first resonant frequency of the reducing coil is adjusted by the first capacitor such that the reducing coil resonates at a frequency lower than a first harmonic of the magnetic field formed by the first induced current, the second resonant frequency of the reducing coil is adjusted by the second capacitor such that the reducing coil resonates at a frequency lower than a second harmonic of the magnetic field formed by the first induced current, the reducing coil forms a plurality of second induced currents that flow in an opposite direction to the first induced current generated at the transmission coil by the adjusted first resonant frequency and the adjusted second resonant frequency, and the magnetic field formed by the first induced current of the transmission coil is changed based on a second magnetic field formed by the plurality of a second induced currents of the reducing con.

7. The electromagnetic wave reducing apparatus of claim 6, wherein the second harmonic of the magnetic field has a shorter variation of period than the first harmonic of the magnetic field.

8. An electromagnetic wave reducing apparatus, comprising:

a reducing coil provided at a position a predetermined distance spaced apart from one side of a transmission coil for wireless power transmission; and a capacitor coupled to the reducing coil to adjust a resonant frequency formed at the reducing coil, wherein a magnetic field formed by the transmission coil in response to the wireless power transmission is changed based on a magnetic field formed by the reducing coil, wherein the resonant frequency of the reducing coil is adjusted by the capacitor such that the reducing coil resonates at a frequency lower than a harmonic of the magnetic field emitted by the transmission coil, wherein the reducing coil forms a second induced current that flows in an opposite direction to the first induced current generated at the transmission coil by the adjusted resonant frequency, and the magnetic field formed by the first induced current of the transmission coil is cancelled and emitted externally under the influence of a magnetic field formed by the second induced current of the reducing coil.

9. The electromagnetic wave reducing apparatus of claim 8, wherein a distance from the same center of the cylindrical structures to the reducing coil is greater than a distance from the same center of the cylindrical structures to the transmission coil, and a cross-sectional area of the cylindrical structure of the reducing coil is greater than or less than a cross-sectional area of the cylindrical structure of the transmission coil.

* * * * *